US007049370B2

(12) United States Patent
Lettmann et al.

(10) Patent No.: US 7,049,370 B2
(45) Date of Patent: May 23, 2006

(54) NON-AQUEOUS COATING MATERIAL WHICH IS THERMALLY HARDENABLE OR HARDENABLE IN A THERMAL MANNER AND BY MEANS OF ACTINIC RADIATION, METHOD FOR THE PRODUCTION AND USE THEREOF

(75) Inventors: Bernhard Lettmann, Drensteinfurt (DE); Harald Borgholte, Münster (DE); Marion Fischer, Münster (DE)

(73) Assignee: BASF Coatings AG, Munster (DE)

( * ) Notice: Subject to any disclaimer, the term of this patent is extended or adjusted under 35 U.S.C. 154(b) by 223 days.

(21) Appl. No.: 10/363,358

(22) PCT Filed: Sep. 7, 2001

(86) PCT No.: PCT/EP01/10311

§ 371 (c)(1), (2), (4) Date: Feb. 28, 2003

(87) PCT Pub. No.: WO02/20637

PCT Pub. Date: Mar. 14, 2002

(65) Prior Publication Data

US 2003/0181590 A1 Sep. 25, 2003

(30) Foreign Application Priority Data

Sep. 9, 2000 (DE) ................................ 100 44 670

(51) Int. Cl.

| | |
|---|---|
| ***C08F 20/06*** | (2006.01) |
| ***C08L 75/06*** | (2006.01) |
| ***C08L 75/14*** | (2006.01) |
| ***C08L 67/00*** | (2006.01) |

(52) U.S. Cl. ........................ 525/131; 525/439; 525/440

(58) Field of Classification Search ................ 525/131, 525/439, 440

See application file for complete search history.

(56) References Cited

U.S. PATENT DOCUMENTS

| | | | | |
|---|---|---|---|---|
| 4,578,426 | A * | 3/1986 | Lenz et al. | 525/131 |
| 5,326,820 | A | 7/1994 | Hoffmann et al. | 525/123 |
| 5,480,936 | A * | 1/1996 | Duecoffre et al. | 524/839 |
| 5,688,859 | A | 11/1997 | Schneider et al. | 524/591 |
| 5,852,120 | A * | 12/1998 | Bederke et al. | 525/124 |
| 6,048,936 | A * | 4/2000 | Epple et al. | 525/124 |
| 6,063,448 | A * | 5/2000 | Duecoffre et al. | 427/407.1 |
| 6,113,988 | A * | 9/2000 | Borgholte et al. | 427/407.1 |
| 6,268,021 | B1 * | 7/2001 | Flosbach et al. | 427/407.1 |
| 6,309,707 | B1 | 10/2001 | Mayer et al. | 427/386 |

FOREIGN PATENT DOCUMENTS

| | | |
|---|---|---|
| CA | 2048444 | 8/1991 |
| DE | 40 24 204 | 2/1992 |
| DE | 44 21 823 | 1/1996 |
| DE | 199 14 899 | 10/2000 |
| EP | 0 470 461 | 7/1991 |
| EP | 0 722 963 | 1/1996 |

* cited by examiner

*Primary Examiner*—Jeffrey B. Robertson

(57) ABSTRACT

A nonaqueous coating material curable thermally or thermally and with actinic radiation, comprising (A) a hydroxyl-containing binder component comprising
(A1) at least one hydroxyl-containing polyester and
(A2) at least one hydroxyl-containing (meth)acrylate copolymer prepared at least partly in the presence of the polyester (A1)

(B) at least one crosslinking component comprising at least one polyisocyanate, and (C) at least one low molecular mass and/or oligomeric, essentially unbranched, hydrophobic polyester having at least two hydroxyl groups in the molecule, an OH number of from 56 to 500 mg KOH/g, an acid number <10 mg KOH/g, and a number-average molecular weight Mn of from 300 to 2000 daltons;

process for its preparation, and its use.

19 Claims, No Drawings

NON-AQUEOUS COATING MATERIAL WHICH IS THERMALLY HARDENABLE OR HARDENABLE IN A THERMAL MANNER AND BY MEANS OF ACTINIC RADIATION, METHOD FOR THE PRODUCTION AND USE THEREOF

This application is a National Phase Application of Patent Application PCT/EP01/10311 filed on 7 Sep. 2001.

The present invention relates to a novel nonaqueous coating material curable thermally or thermally and with actinic radiation. The present invention also relates to a novel process for preparing a coating material, especially the novel coating material. The present invention additionally relates to the use of the novel coating material to produce coatings, especially automotive OEM finishes, commercial vehicle finishes, and automotive refinishes.

Nonaqueous coating materials curable thermally or thermally and with actinic radiation and comprising (A) a hydroxyl-containing binder component comprising
  (A1) at least one hydroxyl-containing polyester and
  (A2) at least one hydroxyl-containing (meth)acrylate copolymer prepared at least partly in the presence of the polyester (A1) and (B) at least one crosslinking component comprising at least one polyisocyanate are known from German Patent Application DE 40 24 204 A1 or from International Patent Application WO 96/26969.

The coating materials known from German Patent Application DE 40 24 204 A1 have a long pot life despite which they may be cured very rapidly at room temperature or slightly elevated temperature. The coatings produced from them have very good mechanical properties and good gloss retention, crack resistance, fullness, and evenness.

Furthermore, the coating materials known from International Patent Application WO 96/26969, and the coatings produced from them, respectively, have improved masking resistance, solvent resistance, and surface hardness.

The known coating materials have the disadvantage that the amount of volatile organic compounds emitted in the course of their application and curing exceeds the current statutory provisions. In other words, the volatile organic compounds (VOC) content of the known coating materials is too high and surpasses the presently valid limits.

Since, however, the known coating materials and the coatings produced from them, as indicated above, possess outstanding performance properties, it would be highly desirable to be able to continue to use them. To do so, however, would require the VOC to be reduced below the statutory limits without impairment to the profile of properties. Increasing the solids content and/or adding water, however, leads to an unacceptable impairment of the performance properties of coating material and coating.

German Patent Application DE 199 14 899.6, unpublished at the priority date of the present specification, describes an aqueous coating material comprising at least three components, viz. a component (I) comprising at least one oligomeric or polymeric resin containing functional groups which react with isocyanate groups, as binder (A), a component (II) comprising at least one polyisocyanate, as crosslinking agent (B), and a component (III) comprising water, and component (I) and/or (III) comprising at least one essentially unbranched hydrophobic polyester (C) which is of low molecular mass and/or is oligomeric, has at least two hydroxyl groups in the molecule and has an OH number of from 56 to 500 mg KOH/g, an acid number <10 mg KOH/g, and a number-average molecular weight Mn of from 450 to 2000 daltons.

It is an object of the present invention to provide a new nonaqueous coating material, curable thermally or thermally and with actinic radiation, which is obtainable by simple material variation of known coating materials, has a long pot life, and nevertheless cures rapidly at room temperature or slightly elevated temperature to give coatings possessing very good mechanical properties and also very good gloss retention, crack resistance, fullness and evenness, masking resistance, solvent resistance and surface hardness, the VOCs falling below the prescribed limits without detriment to the advantageous profile of properties of coating material and coating.

Accordingly we have found the novel nonaqueous coating material curable thermally or thermally and with actinic radiation and comprising (A) a hydroxyl-containing binder component comprising
  (A1) at least one hydroxyl-containing polyester and
  (A2) at least one hydroxyl-containing (meth)acrylate copolymer prepared at least partly in the presence of the polyester (A1), (B) at least one crosslinking component comprising at least one polyisocyanate, and (C) at least one low molecular mass and/or oligomeric, essentially unbranched, hydrophobic polyester having at least two hydroxyl groups in the molecule, an OH number of from 56 to 500 mg KOH/g, an acid number <10 mg KOH/g, and a number-average molecular weight Mn of from 300 to 2000 daltons.

In the text below, the novel nonaqueous coating material curable thermally or thermally and with actinic radiation is referred to as the "coating material of the invention".

Further subject matter of the invention will emerge from the description.

In the light of the prior art it was surprising and unforeseeable for the skilled worker that the object on which the present invention is based could be achieved through the use of the polyesters (C), since on the contrary it was to have been expected that the addition of polyester (C) to the known coating materials would alter their profile of properties and also the profile of properties of the coatings produced from them in an unforeseeable and deleterious way. However, the inventive addition of the polyesters (C) solved the problems described above without the need to make any fundamental alteration to the material composition of the known coating materials.

The coating material of the invention is curable thermally or thermally and with actinic radiation. It is thermally externally crosslinking.

In the context of the present invention, binders are referred to as externally crosslinking if they comprise one kind of complementary reactive functional groups (in the present case hydroxyl groups) which are able to undergo crosslinking reactions with another kind of complementary reactive functional groups (in the present case isocyanate groups) in a curing or crosslinking agent. For further details, reference is made to Römpp Lexikon Lacke und Druckfarben, Georg Thieme Verlag, Stuttgart, New York, 1998, "Curing", pages 274 to 276, especially bottom of page 275.

In the context of the present invention, actinic radiation is electromagnetic radiation such as near infrared (NIR), visible light, UV radiation or X-rays, especially UV radiation, and corpuscular radiation such as electron beams.

The joint use of thermal curing and actinic radiation curing is referred to by those in the art as dual cure.

In the text below, the individual constituents of the coating material of the invention are elucidated further.

The coating material of the invention comprises a hydroxyl-containing binder component (A) comprising (A1) from 20 to 60% by weight, preferably from 30 to 50% by weight, of at least one polyester, and (A2) from 40 to 80% by weight, preferably from 50 to 70% by weight, of at least one hydroxyl-containing (meth) acrylate copolymer prepared at least partly in the presence of the polyester (A1).

The binder component (A) preferably has a hydroxyl number of from 80 to 150, with particular preference from 85 to 105 mg KOH/g and an acid number of from 0.1 to 10, preferably from 4 to 8 mg KOH/g.

It is essential to the invention that the polyester (A1) has an OH number of from 90 to 130, preferably from 90 to 110 mg KOH/g, an acid number of less than 10 mg KOH/g, preferably from 1 to 8 mg KOH/g, a number-average molecular weight of from 1300 to 3500, preferably from 1350 to 2000, and a polydispersity of from 5 to 50, preferably from 5 to 10. The polydispersity is defined as the ratio of weight-average molecular weight to number-average molecular weight. The molecular weights are in each case determined by gel permeation chromatography against polystyrene standard.

The polyesters (A1) are preferably obtainable by reacting p1) polycarboxylic acids or their esterifiable derivatives, alone or together with monocarboxylic acids, p2) polyols, alone or together with monools, p3) if desired, further, modifying components, and p4) if desired, a component reactive with the reaction product of (p1), (p2) and, if used, (p3).

Examples of polycarboxylic acids which may be used as component (p1) include aromatic, aliphatic and cycloaliphatic polycarboxylic acids. As component (p1) it is preferred to use aromatic and/or aliphatic polycarboxylic acids.

Examples of suitable polycarboxylic acids are phthalic acid, isophthalic acid, terephthalic acid, halophthalic acids, such as tetrachloro- and tetrabromophthalic acid, adipic acid, glutaric acid, azelaic acid, sebacic acid, fumaric acid, maleic acid, trimellitic acid, pyromellitic acid, tetrahydrophthalic acid, hexahydrophthalic acid, 1,2-cyclohexanedicarboxylic acid, 1,3-cyclohexanedicarboxylic acid, 1,4-cyclohexanedicarboxylic acid, 4-methylhexahydrophthalic acid, endomethylenetetrahydrophthalic acid, tricyclodecanedicarboxylic acid, endoethylenehexahydrophthalic acid, camphoric acid, cyclohexanetetracarboxylic acid, cyclobutanetetracarboxylic acid, etc. The cycloaliphatic polycarboxylic acids may be used either in their cis or in their trans form and also as a mixture of both forms. Also suitable are the esterifiable derivatives of the abovementioned polycarboxylic acids, such as their monoesters or polyesters with aliphatic alcohols having 1 to 4 carbon atoms or hydroxy alcohols having 1 to 4 carbon atoms. A further possibility is to use the anhydrides of the abovementioned acids, where they exist.

If desired, together with the polycarboxylic acids (p1) it is also possible to use monocarboxylic acids (p1), such as benzoic acid, tert-butylbenzoic acid, lauric acid, isononanoic acid and fatty acids of naturally occurring oils, for example. Preferably, isononanoic acid is used as monocarboxylic acid.

Suitable alcohol components (p2) for preparing the polyester or alkyd resin (A1) are polyhydric alcohols, such as ethylene glycol, propanediols, butanediols, hexanediols, neopentyl glycol, diethylene glycol, cyclohexanediol, cyclohexanedimethanol, trimethylpentanediol, ethylbutylpropanediol, ditrimethylolpropane, trimethylolethane, trimethylolpropane, glycerol, pentaerythritol, dipentaerythritol, trishydroxyethyl isocyanate, polyethylene glycol, polypropylene glycol, alone or together with monohydric alcohols (p2), such as butanol, octanol, lauryl alcohol, ethoxylated and/or propoxylated phenols, for example.

Particularly suitable components (p3) for preparing the polyesters (A1) are compounds having a group which is reactive toward the functional groups of the polyester, with the exception of the compounds specified as component (p4). As modifying component (p3) it is preferred to use polyisocyanates and/or diepoxide compounds, along with monoisocyanates and/or monoepoxide compounds if desired. Suitable compounds (p3) are described, for example, in DE 40 24 204 A1 on page 4 lines 4 to 9.

Suitable components (p4) for preparing the polyesters or alkyd resins (A1) are compounds which in addition to a group which is reactive toward the functional groups of the polyester (A1) also have a tertiary amino group, examples being monoisocyanates containing at least one tertiary amino group or mercapto compounds containing at least one tertiary amino group. For details, reference is made to DE 40 24 204 A1, page 4 lines 10 to 49.

The polyesters (A1) are prepared in accordance with the known methods of esterification [cf. various standard works, such as, for example:

1. Temple C. Patton, Alkyd Resin Technology, Interscience Publishers John Wiley & Sons, New York, London 1962;
2. Dr. Johannes Scheiber, Chemie und Technologie der künstlichen Harze, Wissenschaftliche Verlags-gesellschaft mbH, Stuttgart, 1943;
3. Hans Wagner+Hans-Friedrich Sarx, Lackkunstharze, 4th Edition, Carl Hanser Verlag, Munich, 1959;
4. Ullmanns Encyklopädie der technischen Chemie, Volume 14, pages 80 to 106 (1963)].

The reaction takes place usually at temperatures between 180 and 280° C., in the presence if desired of an appropriate esterification catalyst, such as lithium octoate, dibutyltin oxide, dibutyltin dilaurate, para-toluenesulfonic acid and the like, for example.

Normally, the preparation of the polyesters (A1) is conducted in the presence of small amounts of an appropriate solvent as entrainer. Examples of entrainers used are aromatic hydrocarbons, such as especially xylene and (cyclo) aliphatic hydrocarbons, e.g., cyclohexane.

The (meth)acrylate copolymers used as component (A2) in the coating materials of the invention have OH numbers of from 50 to 150 mg KOH/g, preferably from 70 to 105 mg KOH/g, and acid numbers of from 0 to 10 mg KOH/g, preferably from 0 to 8 mg KOH/g, the OH numbers and acid numbers each being calculated without taking into account the polyester component (A1). The number-average molecular weights of the (meth)acrylate copolymers (A2) prepared in the presence of the polyesters (A1) are usually between 1500 and 5000, preferably between 2000 and 4000, in each case measured by GPC polystyrene standard.

It is essential to the invention that the (meth)acrylate copolymer (A2) has been prepared at least partly in the presence of a polyester resin (A1). Advantageously, at least 30% by weight and, preferably, at least 40% by weight of the component (A2) is prepared in the presence of the component (A1).

Any remaining amount of the component (A2) is added subsequently to the binder solution and/or to the coating material. It is possible for this already polymerized (meth) acrylate copolymer (A2) to have the same monomer composition as the (meth)acrylate copolymer (A2) synthesized in the presence of the polycondensation resin (A1). Alternatively, it is possible to add a hydroxyl-containing polyaddition resin and/or polycondensation resin having a different monomer composition. A further possibility is to add a mixture of different polyaddition resins (A2) and/or polycondensation resins (A1), one resin possibly having the same monomer composition as the polyaddition resin (A2) synthesized in the presence of the polycondensation resin (A1).

It is further essential to the invention that the (meth) acrylate copolymer (A2) comprises one or more copolymerized monomer components selected from the group of the hydroxyalkyl esters of acrylic acid, methacrylic acid or another alpha,beta-ethylenically unsaturated carboxylic acid which are derived from alkylene glycols that are esterified with the acids, or are obtainable by reacting the acids with alkylene oxides; especially hydroxyalkyl esters of acrylic acid, methacrylic acid or ethacrylic acid in which the hydroxyalkyl group contains up to 20 carbon atoms, such as 2-hydroxyethyl, 2-hydroxypropyl, 3-hydroxypropyl, 3-hydroxybutyl or 4-hydroxybutyl acrylate, methacrylate, ethacrylate or crotonate; 1,4-bis(hydroxymethyl)cyclohexane, octahydro-4,7-methano-1H-indene-dimethanol or methylpropanediol monoacrylate, monomethacrylate, monoethacrylate or monocrotonate; reaction products of cyclic esters, such as ϵ-caprolactone, for example, and these hydroxyalkyl esters; reaction products of acrylic acid and/or methacrylic acid with the glycidyl ester of a carboxylic acid having a tertiary α carbon atom (these glycidyl esters of carboxylic acids branched on the α carbon atom and containing 11 to 13 carbon atoms (Versatic® acid) are obtainable, commercially, for example, under the name Cardura® from Shell; the reaction of the acrylic and/or methacrylic acid with the glycidyl ester may take place before, during or after the polymerization).

Preferably, the acrylate resin (A2) comprises one or more monomers selected from the group consisting of 4-hydroxy-n-butyl acrylate, 4-hydroxy-n-butyl methacrylate, 3-hydroxy-n-butyl acrylate and/or 3-hydroxy-n-butyl methacrylate, together if desired with hydroxyethyl methacrylate.

The (meth)acrylate copolymers (A2) used in accordance with the invention may be prepared by well-known polymerization techniques. Polymerization techniques for preparing (meth)acrylate copolymers are widely known and much described (cf., e.g., Houben-Weyl, Methoden der organischen Chemie, 4th Edition, Volume 14/1, pages 24 to 255 (1961) or German Patent Application DE 40 24 204 A1, page 4 line 66 to page 7 line 38).

The (meth)acrylate copolymers (A2) used in accordance with the invention are prepared preferably with the aid of the solution polymerization technique. In this technique an organic solvent or solvent mixture is usually introduced as an initial charge together with the polyester (A1) and heated to boiling. The monomer mixture to be polymerized, along with one or more polymerization initiators, is then added continuously to this mixture of organic solvent or solvent mixture and polyester resin (A1). The polymerization takes place at temperatures between 100 and 160° C., preferably between 130 and 150° C.

The polymerization is preferably conducted in at least one high-boiling organic solvent (E) which is inert toward the monomers used. Examples of suitable solvents are aromatics with fairly high degrees of substitution, such as Solvent Naphtha®, heavy petroleum spirit, various Solvesso® grades, various Shellsol® grades and Deasol®, and also relatively high-boiling aliphatic and cycloaliphatic hydrocarbons, such as various white spirits, mineral turpentine oil, tetralin and decalin, and also various esters, such as ethyl glycol acetate, butyl glycol acetate, ethyl diglycol acetate, and the like.

As polymerization initiators it is preferred to use initiators which form free radicals. The type and amount of initiator are normally chosen so that the supply of free radicals at polymerization temperature is as constant as possible during the feed phase.

Examples of initiators which may be used include the following: di-tert-butyl peroxide, tert-butyl hydroperoxide, tert-butyl peroxybenzoate, tert-butyl peroxypivalate, tert-butyl peroxy-3,5,5-tri-methylhexanoate, tert-butyl peroxy-2-ethylhexanoate, dicumyl peroxide, cumyl hydroperoxide, tert-amyl peroxybenzoate, tert-amyl peroxy-2-ethylhexanoate, diacyl peroxides, such as diacetyl peroxide, for example, peroxyketals, 2,2-di(tert-amylperoxy)propane, ethyl 3,3-di(tert-amylperoxy)butyrate, and thermally labile highly substituted ethane derivatives, based for example on silyl-substituted ethane derivatives and on benzpinacol. Furthermore, it is also possible to use aliphatic azo compounds, such as azoisovaleronitrile and azobiscyclohexanenitrile, for example.

Initiators containing tert-butyl groups, such as di-tert-butyl peroxide, tert-butyl hydroperoxide, 2,2-di-tert-butylperoxybutane and 1,3-bis(tert-butylperoxyisopropyl)benzene, for example, are used in particular since they promote grafting of the (meth)acrylate copolymer (A2) onto the polyester (A1).

The amount of initiator is from 0.1 to 8% by weight in the majority of cases, based on the amount of monomer to be processed, but may also be higher if desired. The initiator, dissolved in a portion of the solvent used for the polymerization, is metered in gradually during the polymerization reaction. The initiator feed preferably lasts for about 0.5 to 2 hours longer than the monomer feed, in order to ensure a good effect during the postpolymerization phase. In another preferred preparation variant, the initiator feed is commenced about 15 minutes before the addition of the monomers, in order to provide a large supply of free radicals at the beginning of the polymerization. Where the decomposition rate of the initiators used is low under the prevailing reaction conditions, it is also possible to include the initiator in the initial charge.

The polymerization conditions (reaction temperature, feed time of the monomer mixture, amount and nature of the organic solvents and polymerization initiators, possible use of molecular weight regulators, such as mercaptans, thioglycolic esters and chlorinated hydrocarbons, for example) are chosen so that the (meth)acrylate copolymers (A2) used in accordance with the invention have the desired molecular weight.

The acid number of the (meth)acrylate copolymers (A2) used in accordance with the invention may be adjusted by the skilled worker using appropriate amounts of carboxyl-containing monomers. Similar comments apply to the adjustment of the hydroxyl number: it may be controlled by way of the amount of hydroxyl-containing monomers used.

It is preferred as component (A2) to use hydroxyl-containing (meth)acrylate copolymers obtainable by polymerizing (a) from 5 to 95% by weight, preferably from 45 to 85% by weight, of one or more monomers selected from the group of the above-described hydroxyl-containing, ethylenically unsaturated, copolymerizable monomers;

(b) from 5 to 95% by weight, preferably from 15 to 55% by weight, of an aliphatic and/or cycloaliphatic ester of methacrylic and/or acrylic acid other than (a), or of a mixture of such monomers;

(c) from 0 to 30% by weight, preferably from 5 to 15% by weight, of a copolymerizable vinyl ester other than (a) and (b), or of a mixture of such monomers;

(d) from 0 to 85% by weight, preferably from 15 to 60% by weight, of a vinylaromatic hydrocarbon other than (a), (b) and (c), or of a mixture of such monomers, and (e) from 0 to 10% by weight, preferably from 0 to 8% by weight, of a further ethylenically unsaturated monomer other than (a), (b), (c) and (d), or of a mixture of such monomers, at least partly in the presence of component (A1) to give the (meth)acrylate copolymer (A2), the sum of the weight fractions of the monomers (a) to (e) being in each case 100% by weight.

As the monomer (b) it is possible in principle to use any aliphatic or cycloaliphatic esters of acrylic acid or of methacrylic acid, other than (a), or a mixture of such monomers. Examples include aliphatic esters of acrylic acid and of methacrylic acid, such as methyl, ethyl, propyl, n-butyl, isobutyl, tert-butyl, n-hexyl, 2-ethylhexyl, stearyl and lauryl acrylate and also the corresponding methacrylates, for example, and cycloaliphatic esters of (meth)acrylic acid, such as furfuryl, cyclohexyl, isobornyl, and t-butylcyclohexyl acrylate and methacrylate, for example.

Monomers (c) used are vinyl esters of monocarboxylic acids. It is preferred to use vinyl esters of α-branched monocarboxylic acids having 5 to 15 carbon atoms per molecule. The branched monocarboxylic acids may be obtained by reacting formic acid or carbon monoxide and water with olefins in the presence of a liquid, strongly acidic catalyst; the olefins may be cracking products of paraffinic hydrocarbons, such as mineral oil fractions, and may comprise both branched and straight-chain acyclic and/or cycloaliphatic olefins. The reaction of such olefins with formic acid or with carbon monoxide and water produces a mixture of carboxylic acids in which the carboxyl groups are located predominantly on a quaternary carbon atom. Other olefinic starting materials are, for example, propylene trimer, propylene tetramer, and diisobutylene. The vinyl esters may also be prepared in the manner known per se from the acids, for example, by reacting the acids with acetylene.

Particular preference is given, owing to their ready availability, to vinyl esters of saturated aliphatic monocarboxylic acids with 9–11 carbon atoms which are branched on the α carbon atom.

Also particularly preferred is the vinyl ester of p-tert-butylbenzoic acid. Examples of further suitable vinyl esters are vinyl acetate and vinyl propionate.

Monomers (d) used are vinylaromatic hydrocarbons, such as styrene, α-alkylstyrenes, such as α-methylstyrenes, chlorostyrenes, o-, m- and p-methylstyrene, 2,5-dimethylstyrene, p-methoxystyrene, p-tert-butylstyrene, p-dimethylaminostyrene, p-acetamidostyrene, and vinyltoluene, preference being given to the use of vinyltoluenes, and especially styrene.

As component (e) it is possible in principle to use any ethylenically unsaturated monomer other than (a), (b), (c) and (d), or a mixture of such monomers. Examples of monomers which may be used as component (e) include the following: carboxyl-containing monomers, such as acrylic and/or methacrylic acid, for example; amides of acrylic acid and methacrylic acid, such as methacrylamide and acrylamide, for example; nitriles of methacrylic acid and acrylic acid; and vinyl ethers and vinyl esters.

The further essential constituent of the coating material of the invention is at least one crosslinking component (B). It comprises or consists of at least one polyisocyanate.

Examples of suitable polyisocyanates (B) are organic polyisocyanates containing free isocyanate groups attached to aliphatic, cycloaliphatic, araliphatic and/or aromatic moieties. Preference is given to polyisocyanates having from 2 to 5 isocyanate groups per molecule. If desired, small amounts of organic solvents, preferably from 1 to 25% by weight, based on the polyisocyanate itself, may be added to the polyisocyanates in order to make it easier to incorporate them. Suitable solvent additives for the polyisocyanates are, for example, ethoxyethyl propionate, butyl acetate and the like.

Examples of suitable polyisocyanates (B) are described, for example, in "Methoden der organischen Chemie", Houben-Weyl, Volume 14/2, 4th Edition, Georg Thieme Verlag, Stuttgart 1963, pages 61 to 70, and by W. Siefken, Liebigs Ann. Chem. 562, 75 to 136.

Suitable examples include 1,2-ethylene diisocyanate, 1,4-tetramethylene diisocyanate, 1,6-hexamethylene diisocyanate, 2,2,4- and 2,4,4-trimethyl- 1,6-hexamethylene diisocyanate, 1,12-dodecane diisocyanate, ω,ω'-diisocyanatodipropyl ether, cyclobutane 1,3-diisocyanate, cyclohexane 1,3- and 1,4-diisocyanate, 2,2- and 2,6-diisocyanato-1-methylcyclohexane, 3-isocyanatomethyl-3,5,5-trimethylcyclohexyl isocyanate ("isophorone diisocyanate"), 2,5- and 3,5-bis(isocyanatomethyl)-8-methyl-1,4-methanodecahydronaphthalene, 1,5-, 2,5-, 1,6- and 2,6-bis(isocyanatomethyl)-4,7-methanohexahydroindane, 1,5-, 2,5-, 1,6- and 2,6-bis(isocyanato)-4,7-methanohexahydroindane, dicyclohexyl 2,4'- and 4,4'-diisocyanate, 2,4- and 2,6-hexahydrotolylene diisocyanate, perhydro-2,4'- and -4,4'-diphenylmethane diisocyanate, ω,ω'-diisocyanato-1,4-diethylbenzene, 1,3- and 1,4-phenylene diisocyanate, 4,4'-diisocyanatobiphenyl, 4,4'-diisocyanato-3,3'-dichlorobiphenyl, 4,4'-diisocyanato-3,3'-dimethoxybiphenyl, 4,4'-diisocyanato-3,3'-dimethylbiphenyl, 4,4'-diisocyanato-3,3'-diphenylbiphenyl, 2,4'- and 4,4'-diisocyanatodiphenylmethane, naphthylene 1,5-diisocyanate, tolylene diisocyanates, such as 2,4- and 2,6-tolylene diisocyanate, N,N'-(4,4'-dimethyl-3,3'-diisocyanatodiphenyl)uretdione, m-xylylene diisocyanate, dicyclohexylmethane diisocyanate, tetramethylxylylene diisocyanate, and also trilsocyanates, such as 2,4,4'-triisocyanatodiphenyl ether and 4,4',4"-triisocyanatotriphenylmethane. It is preferred, alone or in combination with the abovementioned polyisocyanates, to use polyisocyanates containing isocyanurate groups, biuret groups, allophanate groups, uretdione groups, iminooxadiazinedione groups, urethane groups and/or urea groups. Polyisocyanates containing urethane groups, for example, are obtained by reacting some of the isocyanate groups with polyols, such as trimethylolpropane and glycerol, for example.

Preference is given to the use of aliphatic or cycloaliphatic polyisocyanates (B), especially hexamethylene diisocyanate, dimerized and trimerized hexamethylene diisocyanate, isophorone diisocyanate, dicyclohexylmethane 2,4'-diisocyanate or dicyclohexylmethane 4,4'-diisocyanate, or mixtures of these polyisocyanates. Very particular preference is given to using mixtures of polyisocyanates based on hexamethylene diisocyanate and containing uretdione and/or isocyanurate groups and/or allophanate groups, as formed by catalytic oligomerization of hexamethylene diisocyanate using appropriate catalysts. The crosslinking component (B) may otherwise comprise any desired mixtures of the exemplified polyisocyanates (B).

The amount of the polyisocyanates (B) used is chosen so that the ratio of the isocyanate groups to the hydroxyl groups of the binder component (A) and of the hydroxyl groups of the hydrophobic polyesters (C) described below is in the range from 1:3 to 3:1. Preferably, the coating materials of the invention contain from 15 to 70% by weight of the polyester-modified (meth)acrylate copolymer (A1/A2), from 0 to 30% by weight of the further binder component (A1) and/or (A2), and from 7 to 50% by weight of the polyisocyanates (B), based in each case on the solids of the coating material of the invention.

In the context of the present invention, "solids" hereinbelow denotes that fraction of the coating material of the invention formed by the coating after curing.

The constituent of the coating material of the invention that is essential to the invention is at least one hydrophobic polyester (C).

The hydrophobic polyesters (C) may be compounds of low molecular mass, having a molecular weight of in particular from 300 to 700 daltons. In accordance with the invention, advantageous hydrophobic polyesters (C) of low molecular mass are those which are not volatile under the conditions of preparation and application of the coating material of the invention.

However, the hydrophobic polyesters (C) may also be oligomeric compounds, having a number-average molecular weight Mn of from 400 to 2000, preferably from 450 to 1500, with particular preference from 600 to 1200, and in particular from 650 to <1000.

The low molecular mass and the oligomeric hydrophobic polyesters (C) may be used individually or as a mixture.

The polyesters (C) are hydrophobic. In the context of the present invention, and in accordance with DIN EN ISO 862:1995-10, the term "hydrophobic" denotes the constitutional property of a molecule to behave exophilically with respect to water; in other words, it displays the tendency not to penetrate into water or to depart the aqueous phase.

The hydrophobic polyesters (C) are essentially unbranched, i.e., in contrast to the dendrimers described below as reactive diluents, their molecules are essentially linear.

The hydrophobic polyesters (C) have at least 2, preferably 4, and especially 3 hydroxyl groups in the molecule. Advantageously, the number of hydroxyl groups is chosen so as to give an OH number of from 56 to 500, preferably from 70 to 450, with particular preference from 80 to 350, and in particular from 100 to 300 mg KOH/g.

The hydrophobic polyesters (C) are essentially free from acid groups, i.e., they have an acid number of <3 mg KOH/g.

Preferred low molecular mass hydrophobic polyesters (C) have the general formula I $$[R^1\text{—CH(OH)—CH}_2\text{—OOC—}]_2R \qquad \text{(I)}$$

where

R=substituted or unsubstituted divalent $C_1$ to $C_{20}$ alkanediyl, $C_2$ to $C_{20}$ alkenediyl, $C_4$ to $C_{20}$ cycloalkanediyl or cycloalkenediyl, $C_6$ to $C_{12}$ arylidene or divalent $C_6$ to $C_{20}$ arylalkyl, arylalkenyl, arylcycloalkyl or arylcycloalkenyl radical; or substituted or unsubstituted divalent aliphatic, cycloaliphatic, acyclic or cyclic olefinically unsaturated, aromatic, aliphatic-aromatic, cycloaliphatic-aromatic, acyclic unsaturated aromatic or cyclic unsaturated aromatic radical containing at least one carboxylic ester group;

$R^1$=hydrogen atom or monovalent substituted or unsubstituted $C_1$ to $C_{20}$ alkyl, $C_2$ to $C_{20}$ alkenyl, $C_4$ to $C_{12}$ cycloalkyl or cycloalkenyl, $C_6$ to $C_{12}$ aryl or $C_6$ to $C_{20}$ arylalkyl, arylalkenyl, arylcycloalkyl, arylcycloalkenyl, alkylaryl, alkenylaryl, cycloalkylaryl, cycloalkenylaryl, alkylcycloalkyl, alkylcycloalkenyl, alkenylcycloalkyl, alkenylcycloalkenyl, cycloalkylalkyl, cycloalkenylalkyl, cycloalkylalkenyl or cycloalkenylalkenyl radical.

Examples of suitable $C_1$ to $C_{20}$ alkanediyl radicals R are methylene, ethylene, propane-1,3-diyl, tetramethylene, pentamethylene, hexamethylene, heptamethylene, dodecane-1,12-diyl or hexadecane-1,16-diyl.

Examples of suitable $C_2$ to $C_{20}$ alkenediyl radicals R are ethene-1,2-diyl, propene-1,3-diyl or dodecene-1,12-diyl.

Examples of suitable $C_4$ to $C_{20}$ cycloalkanediyl radicals R are cyclopentane-1,2- or -1,3-diyl or cyclohexane-1,2-, -1,3- or -1,4-diyl.

Examples of suitable $C_4$ to $C_{20}$ cycloalkenediyl radicals R are cyclopentene-1,2- or -1,3-diyl or cyclohexene-1,2-, -1,3- or -1,4-diyl.

Examples of suitable $C_6$ to $C_{12}$ arylidene radicals R are 1,2-, 1,3- or 1,4-phenylene or 1,3-, 1,4- or 2,5-naphthylene or 1,4'-biphenylene.

Examples of suitable divalent $C_6$ to $C_{20}$ arylalkyl radicals R are

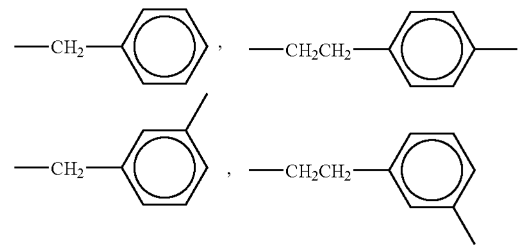

Examples of suitable divalent arylalkenyl radicals are

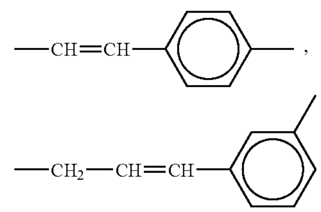

Examples of suitable divalent arylcycloalkyl radicals R are

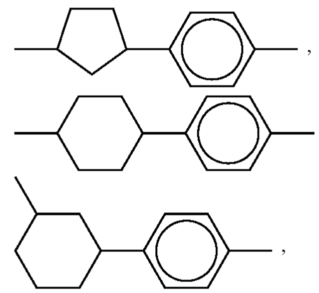

-continued

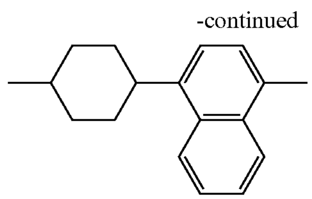

Examples of suitable divalent arylcycloalkenyl radicals R are

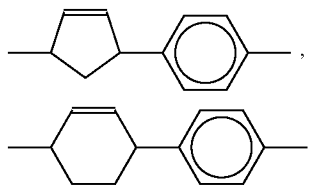

Examples of suitable divalent aliphatic, cycloaliphatic, acyclic or cyclic olefinically unsaturated, aromatic, aliphatic-aromatic, cycloaliphatic-aromatic, acyclic unsaturated aromatic or cyclic unsaturated aromatic radicals R containing at least one carboxylic ester group are

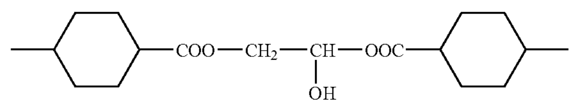

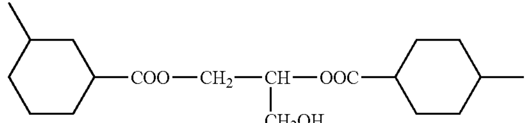

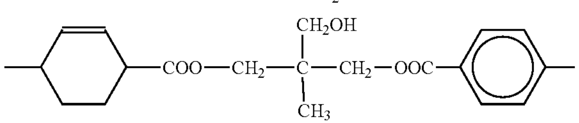

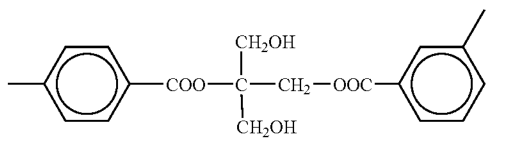

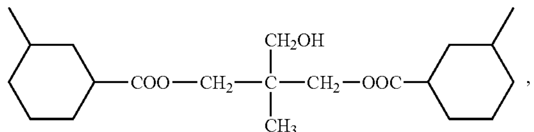

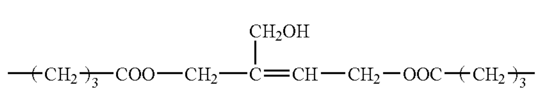

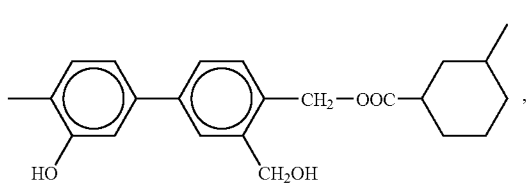

-continued

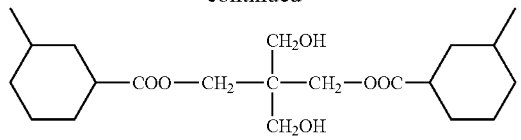

Suitable substituents of these radicals R are all organic functional groups which are essentially inert, i.e., do not undergo any reactions with the crosslinking agents (B). Examples of suitable inert organic radicals are halogen atoms, nitro groups, nitrile groups, and alkoxy groups. Further suitable substituents include functional groups which are able to undergo crosslinking reactions with the crosslinking agents (B), such as amino, thiol or hydroxyl groups, of which the hydroxyl groups are particularly advantageous in accordance with the invention and are therefore used with particular preference.

In accordance with the invention it is especially advantageous if the radical R contains at least one hydroxyl group as substituent.

Examples of suitable, unsubstituted or substituted $C_1$ to $C_{10}$ alkyl radicals $R^1$ for use in accordance with the invention are methyl, ethyl, propyl, butyl, pentyl, hexyl, heptyl, octyl, nonyl or decyl radicals.

Examples of suitable substituted or unsubstituted $C_2$ to $C_{20}$ alkenyl, $C_4$ to $C_{12}$ cycloalkyl or cycloalkenyl, $C_6$ to $C_{12}$ aryl or $C_6$ to $C_{20}$ arylalkyl, arylalkenyl, arylcycloalkyl, arylcycloalkenyl, alkylaryl, alkenylaryl, cycloalkylaryl, cycloalkenylaryl, alkylcycloalkyl, alkylcycloalkenyl, alkenylcycloalkyl, alkenylcycloalkenyl, cycloalkylalkyl, cycloalkenylalkyl, cycloalkylalkenyl or cycloalkenylalkenyl radicals $R^1$ are

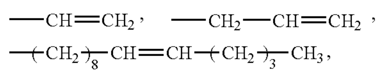

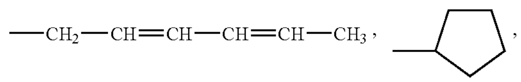

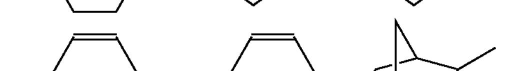

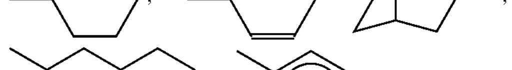

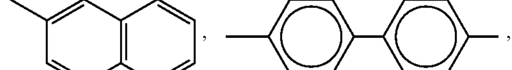

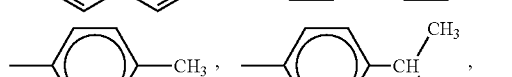

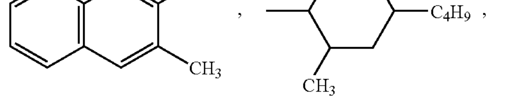

-continued

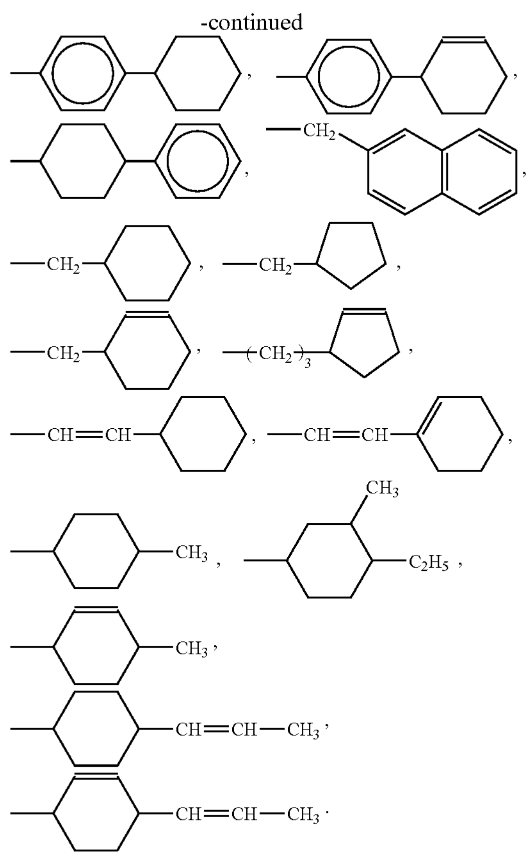

In accordance with the invention it is of advantage if the radical $R^1$ is substituted.

Examples of suitable substituents of the radical $R^1$ are —F, —Cl, —Br, —I, —CN, —$NO_2$, —OH, —$OR^2$, —SH, —$SR_2$, —$NH_2$, —$NHR^2$, —$N(NR^2)_2$ and/or —OOC—$R^2$, where $R^2$ is as defined for $R^1$ with the exception of the hydrogen atom.

Examples of suitable radicals $R^2$ of this kind are those described above in the context of the radicals $R^1$.

Further examples of suitable radicals $R^2$ are branched $C_4$ to $C_{12}$ alkyl radicals, especially 1,1-dimethylethan-1-yl, -propan-1-yl, -butan-1-yl, -pentan-1-yl, -hexan-1-yl or -heptan-1-yl, which are of advantage in accordance with the invention and are therefore used with preference.

In accordance with the invention it is of particular advantage if the radical $R^1$ is a monosubstituted methyl group.

Furthermore, it is of particular advantage in accordance with the invention if the radical $R^1$, especially the methyl group, is substituted by —OOC—$R^2$.

The preparation of the hydrophobic polyesters (C) has no special features in terms of its method but instead takes place by means of the customary and known methods of preparing low molecular mass and oligomeric polyesters. Examples of suitable methods are those described above in the context of the preparation of the polyester (A1).

Advantageous low molecular mass hydrophobic polyesters (C) may be prepared in particular by reacting hydroxydicarboxylic acids with epoxides.

Examples of suitable hydroxydicarboxylic acids are tartronic acid, malic acid, and tartaric acid.

Examples of suitable epoxides, especially those containing glycidyl groups, are ethylene oxide, propylene oxide, epichlorohydrin, glycidol, glycidyl ethers, especially aryl and alkyl glycidyl ethers, or glycidyl esters, especially the glycidyl esters of tertiary, highly branched, saturated monocarboxylic acids, which are sold under the trade name Versatic® acids by Deutsche Shell Chemie. Of these, the Versatic® acid glycidyl esters, which are sold under the trade name Cardura® E10, are of very particular advantage and are therefore used with very particular preference.

An example of an advantageous low molecular mass hydrophobic polyester (C) is the reaction product of malic acid with Cardura® E10.

Oligomeric hydrophobic polyesters (C) which are advantageous in accordance with the invention may be prepared in particular by reacting the diols, triols or tetrols described above in the context of the polyesters (A1) with the dicarboxylic acids described above in the context of the polyesters (A1) and by reacting the resultant polyesters (C) with the above-described epoxides. To prepare the polyesters (C), the polyols are reacted with one another in molar proportions such that linear structures result. The skilled worker is therefore able to determine the appropriate proportions on the basis of his or her experience or on the basis of simple preliminary tests. In the case of the diols, the molar ratio of hydroxyl groups to carboxyl groups is advantageously 1.0; in the case of the triols it is advantageously at least 1.5, in particular at least 2.0; and in the case of the tetrols it is advantageously at least 2.0. The reaction may be conducted in stages or in a one-pot process.

In accordance with the invention, triols are particularly advantageous and are therefore used with particular preference. One example of the particularly advantageous triols is trimethylolpropane, which is used with very particular preference.

In accordance with the invention, the aliphatic and cycloaliphatic dicarboxylic acids are particularly advantageous and are therefore used with particular preference. One example of the particularly advantageous aliphatic dicarboxylic acids is adipic acid; one example of the particularly advantageous cycloaliphatic dicarboxylic acids is hexahydrophthalic acid.

In place of the dicarboxylic acid it is also possible to use, where they exist, their anhydrides or their transesterification-capable derivatives such as the alkyl esters.

The amount of polyester (C) in the coating material of the invention may vary widely and is guided by the requirements of the individual case. The polyesters (C) are preferably used in an amount, based on the solids of the coating material of the invention, of from 1 to 30% by weight.

The coating material of the invention may comprise at least one aromatic mono- and/or polycarboxylic acid and/or at least one anhydride of an aromatic polycarboxylic acid (D) in an amount of from 1.5 to 5% by weight, based on the solids of the coating material. Preference is given in this context to the addition of phthalic anhydride, benzoic acid, and/or alkyl- and/or alkoxy-substituted benzoic acids. With particular preference, benzoic acid (D) is used.

The coating material of the invention may further comprise one or more organic solvents (E). These solvents (E) are usually used in amounts of from 20 to 70% by weight, preferably from 30 to 60% by weight, based in each case on the overall weight of the coating material.

Examples of suitable solvents (E) are those described above.

The coating material of the invention may further comprise suitable customary coatings additives (F) such as color and/or effect pigments, organic and inorganic, transparent or opaque fillers, nano-particles, heat-curable reactive diluents, reactive diluents curable with actinic radiation, UV absorbers, light stabilizers, free-radical scavengers, thermally labile free-radical initiators, photoinitiators and photocoinitiators, other, additional binders curable thermally and/or with actinic radiation, additional crosslinking agents, as used in one-component systems, thermal crosslinking catalysts, devolatilizers, slip additives, polymerization inhibitors, defoamers, emulsifiers, wetting agents, dispersants, adhesion promoters, leveling agents, film-forming auxiliaries, sag control agents (SCAs), rheology control additives (thickeners), flame retardants, siccatives, dryers, antiskinning agents, corrosion inhibitors, waxes, flatting agents, or precursors of organically modified ceramic materials.

The nature and amount of the additives (F) is guided by the intended use of the coatings produced with the aid of the coating materials of the invention.

If, for example, a coating material of the invention is used to produce solid-color topcoats or basecoats, it normally comprises color and/or effect pigments (F) and, if desired, opaque fillers. Where a coating material of the invention is used, for example, to produce clearcoats or sealers, these additives (F) are naturally not present in the coating material in question.

Examples of suitable effect pigments (F) are metal flake pigments such as commercial aluminum bronzes, aluminum bronzes chromated in accordance with DE 36 36 183 A1, and commercial stainless steel bronzes and also nonmetallic effect pigments, such as pearlescent and interference pigments, for example. For further details, reference is made to Römpp Lexikon Lacke und Druckfarben, Georg Thieme Verlag, 1998, page 176, “effect pigments” and pages 380 and 381, “Metal oxide-mica pigments” to “metal pigments”.

Examples of suitable inorganic color pigments (F) are natural pigments such as titanium dioxide, iron oxides, Sicotrans yellow, and carbon black. Examples of suitable organic color pigments (F) are azomethine pigments, azo pigments, polycyclic pigments, thioindigo pigments, and metal complex pigments. For further details, reference is made to Römpp Lexikon Lacke und Druckfarben, Georg Thieme Verlag, 1998, pages 180 and 181, “iron blue pigments” to “black iron oxide”, pages 451 to 453 “pigments” to “pigment volume concentration”, page 563, “thioindigo pigments”, page 567, “titanium dioxide pigments”, pages 400 and 467, “naturally occurring pigments”, page 459, “polycyclic pigments”, page 52, “azomethine pigments”, “azo pigments”, and page 379, “metal complex pigments”.

Examples of suitable organic and inorganic fillers (F) are chalk, calcium sulfates, barium sulfate, silicates such as talc or kaolin, silicas, oxides such as aluminum hydroxide or magnesium hydroxide, or organic fillers such as textile fibers, cellulose fibers, polyethylene fibers, or wood flour. For further details, reference is made to Römpp Lexikon Lacke und Druckfarben, Georg Thieme Verlag, 1998, pages 250 ff., “fillers”.

Examples of suitable thermally curable reactive diluents (F) are positionally isomeric diethyloctanediols or hydroxyl-containing hyperbranched compounds or dendrimers, as described in patent application DE 198 09 643 A1, DE 198 40 605 A1 or DE 198 05 421 A1.

Examples of suitable reactive diluents (F) curable with actinic radiation are those described in Römpp Lexikon Lacke und Druckfarben, Georg Thieme Verlag, Stuttgart, New York, 1998, on page 491 under the heading “reactive diluents”.

Examples of suitable thermally labile free-radical initiators (F) are organic peroxides, organic azo compounds or C-C-cleaving initiators such as dialkyl peroxides, peroxocarboxylic acids, peroxodicarbonates, peroxide esters, hydroperoxides, ketone peroxides, azo dinitriles, and benzpinacol silyl ethers.

Examples of suitable crosslinking catalysts (F) are dibutyltin dilaurate, lithium decanoate, bismuth lactate, bismuth dimethylpropioniate, and zinc octoate.

Examples of suitable photoinitiators and coinitiators (F) are described in Römpp Lexikon Lacke und Druckfarben, Georg Thieme Verlag, Stuttgart, 1998, pages 444 to 446.

Examples of suitable additional crosslinking agents (F) are those commonly used for thermal curing at temperatures above 90° C., such as

- amino resins, as described for example in Römpp Lexikon Lacke und Druckfarben, Georg Thieme Verlag, 1998, page 29, “amino resins”, in the textbook “Lackadditive”, [Coatings additives] by Johan Bieleman, Wiley-VCH, Weinheim N.Y., 1998, pages 242 ff., in the book “Paints, Coatings and Solvents”, second, completely revised edition, D. Stoye and W. Freitag (eds.), Wiley-VCH, Weinheim N.Y., 1998, pages 80 ff., in patents U.S. Pat. No. 4,710,542 A1 and EP-B-0 245 700 A1, and in the article by B. Singh and coworkers, “Carbamylmethylated Melamines, Novel Crosslinkers for the Coatings Industry” in Advanced Organic Coatings Science and Technology Series, 1991, Volume 13, pages 193 to 207;
- carboxyl-containing compounds or resins, as described for example in patent DE 196 52 813 A1;
- resins or compounds containing epoxide groups, as described for example in patents EP 0 299 420 A1, DE 22 14 650 B1, DE 27 49 576 B1, U.S. Pat. No. 4,091,048 A1 and U.S. Pat. No. 3,781,379 A1;
- blocked polyisocyanates, as described for example in patents U.S. Pat. No. 4,444,954 A1, DE 196 17 086 A1, DE 196 31 269 A1, EP 0 004 571 A1 and EP 0 582 051 A1; and/or
- tris(alkoxycarbonylamino)triazines, as described in patents U.S. Pat. No. 4,939,213 A1, U.S. Pat. No. 5,084,541 A1, U.S. Pat. No. 5,288,865 A1 and EP 0 604 922 A1.

Examples of suitable devolatilizers (F) are diazadicycloundecane and benzoin.

Examples of suitable emulsifiers (F) are nonionic emulsifiers, such as alkoxylated alkanols, polyols, phenols and alkylphenols or anionic emulsifiers such as alkali metal salts or ammonium salts of alkanecarboxylic acids, alkanesulfonic acids, and sulfo acids of alkoxylated alkanols, polyols, phenols and alkylphenols.

Examples of suitable wetting agents (F) are siloxanes, fluorine compounds, carboxylic monoesters, phosphoric esters, polyacrylic acids and their copolymers, and polyurethanes.

An example of a suitable adhesion promoter (F) is tricyclodecanedimethanol.

Examples of suitable film-forming auxiliaries (F) are cellulose derivatives such as cellulose acetobutyrate (CAB).

Examples of suitable transparent fillers (F) are those based on silicon dioxide, aluminum oxide or zirconium oxide; for further details, reference is made to Römpp Lexikon Lacke und Druckfarben, Georg Thieme Verlag, Stuttgart, 1998, pages 250 to 252.

Examples of suitable sag control agents (SCAs) (F) are ureas, modified ureas and/or silicas, as are described, for example, in the references EP 0 192 304 A1, DE 23 59 923 A1, DE 18 05 693 A1, WO 94/22968, DE 27 51 761 C1, WO 97/12945 and “farbe+lack”, November 1992, pages 829 ff.

Examples of suitable rheology control additives (F) are those known from patents WO 94/22968, EP 0 276 501 A1, EP 0 249 201 A1 and WO 97/12945; crosslinked polymeric microparticles, as disclosed for example in EP 0 008 127 A1; inorganic phyllosilicates such as aluminum-magnesium silicates, sodium-magnesium phyllosilicates and sodium-magnesium-fluorine-lithium phyllosilicates of the montmorillonite type; silicas such as Aerosils; or synthetic polymers containing ionic and/or associative groups, such as polyvinyl alcohol, poly(meth)acrylamide, poly(meth)acrylic acid, polyvinylpyrrolidone, styrene-maleic anhydride or ethylene maleic anhydride copolymers and their derivatives, or hydrophobically modified ethoxylated urethanes or polyacrylates.

An example of a suitable flatting agent (F) is magnesium stearate.

Examples of suitable precursors (F) for organically modified ceramic materials are hydrolyzable organometallic compounds, especially of silicon and aluminum.

Further examples of the additives (F) recited above, and examples of suitable UV absorbers, free-radical scavengers, leveling agents, flame retardants, siccatives, dryers, antiskinning agents, corrosion inhibitors, and waxes (F), are described in detail in the textbook "Lackadditive" by Johan Bieleman, Wiley-VCH, Weinheim N.Y., 1998.

Particularly advantageous coating materials of the invention comprise, based in each case on their solids, from 15 to 70, preferably from 15 to 45% by weight of the binder component (A), from 7 to 50, preferably from 10 to 45% by weight of the crosslinking component (B), from 1 to 30, preferably from 2 to 25% by weight of at least one polyester (C), and from 1.5 to 5, preferably from 2 to 4.5% by weight of at least one constituent (D), the percentages by weight adding up to 100% by weight.

Where these coating materials of the invention are liquid and have a viscosity suitable for the application, they may be solvent-free, so-called 100% systems. Preferably, however, the coating materials of the invention comprise at least one organic solvent (E) in an amount of preferably from 20 to 70, in particular from 30 to 60% by weight, based in each case on the overall amount of the coating material of the invention. With particular preference, the organic solvent (E) is employed in an amount such that the solid-color topcoat, basecoat and clearcoat materials of the invention meet the statutory VOC (volatile organic compounds) regulations (i.e., VOC<420 g/l).

The preparation of the coating material of the invention has no special features in terms of its method but instead takes place in a customary and known manner by mixing of the above-described constituents in appropriate mixing equipment such as stirred vessels, dissolvers, stirred mills, homogenizers, or extruders.

Where the coating material of the invention also comprises additives (F) which may be activated by actinic radiation, it is preferred to operate in the absence of actinic light in order to prevent premature crosslinking of the coating material.

The constituents may be employed in any desired sequence. For the coating material of the invention, however, it is of advantage if it is prepared by the process of the invention.

In the process of the invention, the binder component (A) and the crosslinking component (B) are mixed with one another before the application of the coating material of the invention. The constituents described above are employed in amounts so as to give the above-described proportions or amounts of constituents in the coating material of the invention.

In accordance with the invention, the binder component (A) is mixed with at least one of the above-described polyesters (C) before the crosslinking component (B) is added. This may be done using the apparatus described above, at room temperature or at higher temperatures. In this context it is further of advantage in accordance with the invention if the above-described aromatic carboxylic acids and/or their anhydrides (D) are mixed in during this process step. In general it is advisable here not to exceed a temperature of 180° C., preferably 150° C. and especially 100° C., in order to prevent thermal damage to the constituents of the binder component (A).

In accordance with the invention, it is also of particular advantage if the above-described polyester(s) (C) is (are) added in the form of a mixing varnish. The composition of the mixing varnishes here may vary widely. In accordance with the invention it is of very particular advantage if the mixing varnish, based on its overall amount, contains from 50 to 90, preferably from 52 to 85, with particular preference from 54 to 80, with very particular preference from 56 to 75, and in particular from 58 to 70% by weight of at least one polyester (C) and from 10 to 50, preferably from 15 to 48, with particular preference from 20 to 46, with very particular preference from 25 to 44, and in particular from 30 to 42% by weight of at least one of the above-described organic solvents (E) and/or at least one of the above-described additives (F).

The binder component (A) and the mixing varnish may be mixed with one another in any desired proportions, provided only that the advantageous proportions described above for the constituents of the coating material of the invention result. In accordance with the invention it is advantageous to employ a volume ratio of (A) to mixing varnish of (3–5):1, preferably (3.5–4.5):1, with particular preference (3.8–4.2):1, and especially 4:1.

Furthermore, the mixture of binder component (A) and mixing varnish, on the one hand, and crosslinking component (B), on the other hand, may be mixed with one another in any desired proportions, provided only that the advantageous proportions described above for the constituents of the coating material of the invention result. In accordance with the invention it is advantageous to employ a ratio of mixture to (B) of (3–5):1, preferably (3.5–4.5):1, with particular preference (3.8–4.2):1 and especially 4:1.

Not least, the resultant mixture of binder component (A), mixing varnish and crosslinking component (B), on the one hand, and at least one organic solvent (E), on the other hand, may be mixed with one another in any desired proportions, provided only that the advantageous proportions described above for the constituents of the coating material of the invention result. In accordance with the invention it is advantageous to employ a volume ratio of [A)+mixing varnish+(B)] to (E) of (4–7):1, preferably (4.5–6.5):1, with particular preference (4.8–6.2):1 and especially 5:1.

The resultant, ready-to-apply coating materials of the invention have a markedly lower VOC content than the known coating materials of identical or comparable composition except for the amount of polyester (C). At the same time, the advantageous profile of properties of the known coating materials is at least fully retained if not in fact exceeded.

The coating materials of the invention are therefore outstandingly suitable for the production of single-coat or multicoat clearcoats or color and/or effect coating systems.

Hence they may be used with advantage as interior and exterior architectural coatings, for automotive OEM finishing, automotive refinishing, the coating of windows, doors or furniture, or industrial coating, including container coating, coil coating and the coating or impregnation of electrical components.

Suitable coating substrates are all surfaces which are undamaged by curing of the films present thereon using heat alone or in combination with actinic radiation (dual cure). Suitable substrates comprise, for example, metals, plastics, wood, ceramic, stone, textile, fiber composites, leather, glass, glass fibers, glass wool, rock wool, mineral- and resin-bound building materials, such as plasterboard and cement slabs or roof tiles, and also assemblies of these materials. Particularly preferred substrates are the bodies, and parts thereof, of automobiles and commercial vehicles.

The coating material of the invention exhibits very particular advantages in the context of automotive refinishing and the coating of commercial vehicles. The refinish of the invention produced from the coating material of the invention is particularly notable for its outstanding adhesion to the original finish. The solid-color topcoat for commercial vehicles that is produced from the coating material of the invention is particularly notable for its masking resistance, its gloss, and its brilliant colors.

However, the coating materials of the invention also exhibit special advantages in the context of automotive OEM finishings. For instance, the aqueous basecoat films produced from the customary and known aqueous basecoat materials may be overcoated without risk of bleeding with the clearcoat materials of the invention, after which the aqueous basecoat films and the clearcoat films are cured jointly (wet-on-wet technique). The resultant multicoat color and/or effect coating systems of the invention are notable for very good evenness, brilliant colors, outstanding metallic effects, and very good gloss.

The coating materials of the invention may be applied by all customary application methods, such as spraying, knife coating, brushing, flow coating, dipping, impregnating, trickling, or rolling, for example. The substrate to be coated may per se be at rest, with the application equipment or unit being moved. Alternatively, the substrate to be coated, especially a coil, may be moved, with the application unit being at rest relative to the substrate or being moved appropriately. Where the coating materials of the invention include constituents which may be activated with actinic radiation, application is preferably conducted in the absence of actinic radiation, especially daylight.

In general, in automotive OEM finishing and refinishing and in the coating of commercial vehicles, the coating materials of the invention are applied in a wet film thickness such that curing thereof gives films having the thicknesses which are advantageous and necessary for their functions. In the case of the solid-color topcoat, this film thickness is from 10 to 150, preferably from 10 to 120, with particular preference from 10 to 100, and in particular from 10 to 90 μm; in the case of the basecoat it is from 5 to 50, preferably from 5 to 40, with particular preference from 5 to 30, and in particular from 10 to 25 μm; and in the case of the clearcoat it is from 10 to 100, preferably from 15 to 80, with particular preference from 20 to 70, and in particular from 25 to 60 μm. It is, however, also possible to employ the multicoat system known from European Patent Application EP 0 817 614 A1, comprising an electrodeposition coat, a first basecoat, a second basecoat, and a clearcoat, in which the overall film thickness of the first and second basecoats is from 15 to 40 μm and the film thickness of the first basecoat is from 20 to 50% of said overall film thickness.

The applied coating film of the invention is cured thermally, or thermally and with actinic radiation (dual cure).

The thermal curing has no special features in terms of its method but instead takes place in accordance with the customary and known methods, such as heating in a forced air oven or irradiation with IR lamps. The thermal curing may also take place in stages.

Preferably, thermal crosslinking is conducted at temperatures below 100° C. In general it is advisable not to exceed temperatures of 90° C., preferably 80° C., and especially 70° C. Preferably, thermal crosslinking is conducted at room temperature.

Curing with actinic radiation is preferably conducted with UV radiation and/or electron beams. It is preferred in this case to employ a dose of from 1000 to 3000, preferably from 1100 to 2900, with particular preference from 1200 to 2800, with very particular preference from 1300 to 2700, and in particular from 1400 to 2600 $mJ/cm^2$. If desired, this curing may be supplemented with actinic radiation from other radiation sources. In the case of electron beams, it is preferred to operate under an inert gas atmosphere. This may be ensured, for example, by supplying carbon dioxide and/or nitrogen directly to the surface of the coating films. In the case of curing with UV radiation as well it is possible to operate under inert gas in order to prevent the formation of ozone.

Curing with actinic radiation is carried out using the customary and known radiation sources and optical auxiliary measures. Examples of suitable radiation sources are flashlamps from the company VISIT, high-pressure or low-pressure mercury vapor lamps, with or without lead doping in order to open up a radiation window of up to 405 nm, or electron beam sources. Their arrangement is known in principle and may be adapted to the circumstances of the workpiece and the process parameters. In the case of workpieces of complex shape, as envisaged for automobile bodies, the areas not accessible to direct radiation (shadow regions) such as cavities, folds and other structural undercuts may be (partly) cured using point, all-round or small-area emitters in conjunction with an automatic movement apparatus for the irradiation of cavities or edges.

The equipment and conditions for these curing methods are described, for example, in R. Holmes, U.V. and E.B. Curing Formulations for Printing Inks, Coatings and Paints, SITA Technology, Academic Press, London, United Kingdom 1984.

Curing may take place in stages, i.e., by multiple exposure to light or actinic radiation. It may also be carried out alternately, i.e., by curing with UV radiation and electron beams in alternation.

Where thermal curing and curing with actinic radiation are employed together, these methods may be used simultaneously or alternately. Where the two curing methods are used alternately, it is possible, for example, to begin with thermal curing and end with actinic radiation curing. In other cases it may prove advantageous to begin with actinic radiation curing and to end with it. Particular advantages result if the coating films are cured in two separate process steps, first with actinic radiation and then thermally.

On application and curing, as well, the coating materials of the invention, at significantly lower VOC contents, exhibit the same outstanding profile of properties as the known coating materials containing no polyesters (C) but otherwise of identical or comparable material composition.

EXAMPLES

Preparation Example 1

The Preparation of a Hydroxyl-Containing Polyester (A1)

A 4 liter polycondensation vessel with stirrer, steam-heated column and water separator was charged with 796 parts by weight of trimethylolpropane, 540 parts by weight of isononanoic acid, 821 parts by weight of phthalic anhydride and 83 parts by weight of xylene and this initial charge was slowly heated. Condensation was carried out at a temperature of max. 190° C. to an acid number of 5 mg KOH/g and a viscosity of 8.0 dPas (60% strength in xylene). The mixture was subsequently cooled, diluted at 130° C. with 910 parts by weight of Shellsol® A and cooled further to room temperature.

The resulting polyester had a solids content of 66.5%, an acid number of 5 mg KOH/g, an OH number of 97 mg KOH/g, and a viscosity of 70 dPas (original).

Preparation Example 2

The Preparation of a (meth)Acrylate Copolymer (A2)

A stainless steel reactor of capacity 4 liters, equipped with stirrer, reflux condenser, an initiator feed and a monomer feed, was charged with 700 parts by weight of the polyester (A1) from Preparation Example 1 and 70 parts by weight of VEOVA® 10 (vinyl ester of Versatic® acid) and this initial charge was heated to 165° C. A monomer mixture of 350 parts by weight of styrene, 155 parts by weight of butanediol monoacrylate and 125 parts by weight of methyl methacrylate was added uniformly with stirring to the initial charge over the course of four hours, as was an initiator solution of 14 parts by weight of di-tert-butyl peroxide, 44 parts by weight of Shellsol®A and 25 parts by weight of xylene over the course of five hours. The feed streams were commenced simultaneously. Following the addition, the reaction mixture was postpolymerized for two hours. The temperature was subsequently lowered to 120° C. and the resulting (meth) acrylate copolymer (A2) was diluted with butyl acetate to a solids content of 65% by weight and admixed with 5 parts by weight of benzoic acid.

The (meth)acrylate copolymer (A2) had a solids content of 65% by weight, an acid number of 5.3 mg KOH/g, a viscosity of 2.3 dPas (55% strength in butyl acetate), and a hydroxyl number of 90 mg KOH/g.

Preparation Example 3

The Preparation of a Polyester (C) for Use in Accordance with the Invention 284.4 parts by weight of hexahydrophthalic anhydride and 98.3 parts by weight of trimethylolpropane were weighed out into a steel reactor and heated to 150° C. Subsequently, 458.5 parts by weight of Versatic® acid glycidyl ester (Cardura® E 10) were metered in at a uniform rate over the course of one hour. The reaction mixture was held at 150° C. until an acid number of 4 mg KOH/g was reached. The resulting polyester was adjusted with butyl acetate at 110° C. to a solids content of 81% by weight. The viscosity of the diluted product was 40 dpas.

Preparation Example 4

The Preparation of a Mixing Varnish for Use in Accordance with the Invention

The mixing varnish for use in accordance with the invention was prepared from 82.7 parts by weight of the polyester (C) from Preparation Example 3, 3 parts by weight of a 2% strength solution of dibutyltin dilaurate, 2.3 parts by weight of a commercial light stabilizer (HALS from Ciba Specialty Chemicals), 0.7 part by weight of a commercial leveling agent (polyether-modified polydimethylsiloxane from Byk), 5 parts by weight of a further commercial leveling agent (acrylate copolymer from Byk) and 6 parts by weight of organic solvents (mixture of butyl acetate and methyl isobutyl ketone).

Preparation Example 5

The Preparation of a Crosslinking Component (B) for Use in Accordance with the Invention The crosslinking component (B) was prepared from the following constituents:

88.6 parts by weight of Desmodur® N 3600[1])

5.7 parts by weight of butyl acetate 98/100 and 5.7 parts by weight of methyl isobutyl ketone.

[1]) Commercial polyisocyanate from Bayer AG, 100%.

Preparation Example 6

The Preparation of a Solvent Mixture (E) for Adjusting the Viscosity for Application The solvent mixture (E) was prepared from the following solvents:

| Solvent | Amount |
|---|---|
| Xylene | 15.0 parts by weight |
| Solventnaphta ® | 13.0 parts by weight |
| Petroleum spirit 135/180 | 10.0 parts by weight |
| Butyl glycol acetate | 3.0 parts by weight |
| n-Butyl acetate 98/100 | 50.0 parts by weight |
| 1-Methoxypropyl 2-acetate | 5.0 parts by weight |
| Butoxyl | 2.0 parts by weight |
| Dipentenes | 2.0 parts by weight |

Example

The Preparation of a Clearcoat Material of the Invention and of a Clearcoat of the Invention for Automotive OEM Finishing or Refinishing To prepare the clearcoat material of the invention, the (meth)acrylate copolymer (A2) from Preparation Example 2 and the mixing varnish from Preparation Example 4 were mixed with one another in a volume ratio of (A2) to mixing varnish of 4:1.

The resulting mixture was mixed in turn with the crosslinking component (B) from Preparation Example 5 and the solvent mixture (E) from Preparation Example 6 in a volume ratio of mixture to (B) to (E) of 4:1:1, to give the ready-to-apply clearcoat material of the invention. It had a VOC of less than 420 g/l, which was therefore below the limit prescribed by statute.

The clearcoat material was applied in two spray passes with a flash-off time of 15 minutes in between to steel panels which had been coated with a surfacer coat produced from a commercial conventional surfacer (commercial product Glasurit Grundfüller [primer-surfacer] 283–1874 from Glasurit GmbH, Münster, Germany) based on a binder containing epoxide groups and on an amino-functional curing agent, and with a black basecoat produced from a commercial black basecoat material from BASF Coatings AG. The clearcoat film was subsequently dried at 20° C. for 16 h. The dry film thickness was from 50 to 60 μm.

The clearcoat of the invention was outstandingly even and free from surface defects. It showed outstanding adhesion to the basecoat, and this adhesion was essentially retained even after exposure in a constant condensation climate. It was scratch resistant and stable to weathering and to chemicals. Furthermore, it was masking resistant in the sense of the masking test described in Examples 1 to 6 of International Patent Application WO 96/26969.

What is claimed is:

1. A nonaqueous coating material curable thermally or thermally and with actinic radiation, comprising (A) a hydroxyl-containing binder component comprising
  (A1) at least one hydroxyl-containing polyester and
  (A2) at least one hydroxyl-containing (meth)acrylate copolymer prepared at least partly in the presence of the polyester (A1), (B) at least one crosslinking component comprising at least one polyisocyanate and (C) at least one unbranched, hydrophobic polyester having at least two hydroxyl groups per molecule, an OH number of from 56 to 500 mg KOH/g, an acid number <10 mg KOH/g, and a number-average molecular weight (Mn) of from 300 to 2000 daltons, wherein the at least one hydroxyl-containing polyester (A1) and the hydrophobic polyester (C) are not the same and the polyester (C) has the genaral formula I

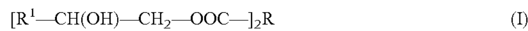

$$[R^1—CH(OH)—CH_2—OOC—]_2R \quad (I)$$

where

R=substituted or unsubstituted divalent radical selected from the groups consisting of $C_1$ to $C_{20}$ alkanediyl radicals, $C_2$ to $C_{20}$ alkenediyl radicals, $C_4$ to $C_{12}$ cyclolkanediyl radicals, $C_4$ to $C_{20}$ alkenediyl radicals, $C_6$ to $C_{12}$ arylidene radicals, $C_6$ to $C_{20}$ arylalkyl radicals, $C_6$ to $C_{20}$ arylalkenyl radicals, $C_6$ to $C_{20}$ arylcycloalkyl radicals, $C_6$ to $C_{20}$ arylcycloalkenyl radicals, aliphatic radicals, cycloaliphatic radicals, acyclic or cyclic olefinically unsaturated radicals, aromatic radicals, aliphatic-aromatic radicals, cycloaliphatic-aromatic radicals, acyclic unsaturated aromatic or cyclic unsaturated aromatic radicals containing at least one carboxylic ester group, and mixtures thereof, and $R^1$=a hydrogon atom or a monovalent substituted or unsubstituted radical selected fon the from the group consisting of $C_1$ to $C_{20}$ alkyl radicals, $C_2$ to $C_{20}$ alkenyl radicals, $C_4$ to $C_{12}$ cycloalkyl radicals, $C_4$ to $C_{12}$ cycloalkenyl radicals, $C_6$ to $C_{12}$ aryl radicals, $C_6$ to $C_{20}$ arylalkyl radicals, $C_6$ to $C_{20}$ arylalkenyl radicals, $c_6$ to $C_{20}$ arylcycloalkyl radicals, $C_6$ to $C_{20}$ arylcycloalkenyl radicals, $C_6$ to $C_{20}$ alkylaryl radicals, $C_6$ to $C_{20}$ alkenylaryl radicals, $C_6$ to $C_{20}$ cycloalkylaryl radicals, $C_6$ to $C_{20}$ cycloalkenylaryl radicals, $C_6$ to $C_{20}$ alkyl radicals, $C_6$ to $C_{20}$ cycloalkyl radicals, $C_6$ to $C_{20}$ alkylcycloalkenyl radicals, $C_6$ to $C_{20}$ alkenylcycloalkyl radicals, $C_6$ to $C_{20}$ alkenylcycloalkenyl radicals, $C_6$ to $C_{20}$ cycloalkylalkyl radicals, $C_6$ to $C_{20}$ cycloalkenylalkyl radicals, $C_6$ to $C_{20}$ cycloalkylalkenyl radicals, $C_6$ to $C_{20}$ cycloalkenylalkenyl radical, and mixtures thereof.

2. The coating material of claim 1, wherein hydroxyl containing binder component (A), based on its overall amount, comprises from 20 to 60% by weight of polyester (A1) and from 40 to 80% by weight of the (meth)acrylate copolymer(A2).

3. The coating material of claim 1, further comprising at least ono aromatic compound (D) having at least one carboxylic acid functional group or anhydride functional group.

4. The coating material of claim 1, wherein the radical R comprises at least one hydroxyl group.

5. The coating material of claim 1, wherein tho radical $R^1$ is substituted.

6. The coating material of claim 5, wherein radical $R^1$ is a monosubstituted methyl group.

7. The coating material of claim 1, wherein polyester (C) is present in an amount of from 1 to 30% by weight, based on the solids of the coating material.

8. The coating material of claim 3, comprising, based on its solids, from 15 to 70% by weight of the binder component (A),
from 7 to 50% by weight of the crosslinking component (B),
from 1 to 30% by weight of at least one polyester (C), and
from 1.5 to 5% by weight of at least one constituent (D),
the percentages by weight adding up to 100% by weight.

9. The coating material of claim 8, further comprising, based on its overall amount, from 20 to 70% by weight of at least one organic solvent (E).

10. A process for preparing a nonaqueous coating material of claim 1, comprising adding to the binder component (A), prior to mixing, the least one unbranched, hydrophobic polyester (C) containing at least two hydroxyl groups in the molecule and having an OH number or from 56 to 500 mg KOH/g, an acid number <10 mg KOH/g and a number-average molecular weight Mn of from 300 to 2000 daltons, mixing the mixture of binder component (A) and polyester (C) with a crosslinking component (B).

11. The process of claim 10, wherein the polyester (C) is added in the form or a mixing varnish containing, based on the mixing varnish, from 50 to 90% by weight of at least one polyester (C) and from 10 to 50% by weight of a member selected from the group consisting of at least one organic solvent (E), one or more customary coatings additives (F), and mixtures thereof.

12. The process of claim 11, wherein the binder component (A) and the mixing varnish are mixed with one another in a volume ratio of (A) to mixing varnish of (3–5):1.

13. The process of claim 12, wherein the mixture of binder component (A) and mixing varnish and the crosslinking component (B) are mixed with one another in a volume ratio of mixture to (B) of(3–5):1.

14. The process as claimed in claim 13, wherein the mixture of binder component (A), mixing varnish and crosslinking component (B) with at least one organic solvent (E) is mixed together in a volume ratio of [(A)+mixing varnish+(B)] to (E) of (4–7):1.

15. A method of making a coated substrate, comprising applying the coating material of claim 1 to a substrate.

16. The method of claim 15 wherein the substrate is selected from the group of substrates consisting of interior and exterior architectural coating substrates, automotive OEM finishing substrates, automotive refinishing substrates, commercial vehicle substrates, window substrates, door substrates, furniture substrates, industrial coating substrates, container coating substrates, coil coating substrates, electrical components substrates, and mixtures thereof.

17. The coating material of claim 5, wherein the radical $R^1$ is substituted with a substituent selected from the group consisting of —F, —Cl, —Br, —I, —CN, —$NO_2$, —OH, —$OR^2$, —SH, —$SR^2$, —$NH_2$, —$NHR^2$, —$N(NR^2)_2$, —OOC—$R^2$, and mixtures thereof, wherein $R^2$ is as defined for $R^1$ with the exception of a hydrogen atom.

18. The coating material of claim 6, wherein the radical $R^1$ is a methyl group monosubstituted by —OOC—$R^2$ where the radical $R^2$ is a branched $C_4$ to $C_{12}$ alkyl radical.

19. A nonaqueous coating material curable thermally or thermally and with actinic radiation, comprising (A) a hyciroxyl-containing binder component comprising
(A1) from 20 to 60% of at least one hydroxyl-containing polyester and
(A2) from 40 to 80% ol at least one hydroxyl-containing (meth)acrytate copolymer prepared at least partly in the presence of the polyester (A1), (B) at least one crosslinking component comprising at least one polyisocyanate and (C) at least one unbranched, hydrophobic polyester having at least two hydroxyl groups per molecule, an OH number of from 56 to 500 mg KOH/g an acid nurnber <10 mg KOH/g, ond a number-average molecular weight (Mn) of from 300 to 2000 deltons and the general formula I

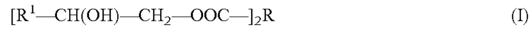

$$[R^1\text{—CH(OH)—CH}_2\text{—OOC—}]_2R \quad \text{(I)}$$

where

R=substituted or unsubstituted divalent radical selected from the groups consisting of $C_1$ to $C_{20}$ alkanediyl radicals, $C_2$ to $C_{20}$ alkenediyl radicals, $C_4$ to $C_{12}$ cyclolkanediyl radicals, $C_4$ to $C_{20}$ alkenediyl radicals, $C_6$ to $C_{12}$ arylidene radicals, $C_6$ to $C_{20}$ arylalkyl radicals, $C_6$ to $C_{20}$ arylalkenyl radicals, $C_6$ to $C_{20}$ arylcycloalkyl radicals, $C_6$ to $C_{20}$ arylcycloalkenyl radicals, aliphatic radicals, cycloaliphatic radicals, acyclic or cyclic olefinically unsaturated radicals, aromatic radicals, aliphatic-aromatic radicals, cycloaliphatic-aromatic radicals, acyclic unsaturated aromatic or cyclic unsaturated aromatic radicals containing at least one carboxylic ester group, and thereof, and $R^1$=a hydrogon atom or a monovalent substituted or unsubstituted radical selected fon the from the group consisting of $C_1$ to $C_{20}$ alkyl radicals, $C_2$ to $C_{20}$ alkenyl radicals, $C_4$ to $C_{12}$ cycloalkyl radicals, $C_4$ to $C_{12}$ cycloalkenyl radicals, $C_6$ to $C_{12}$ aryl radicals, $C_6$ to $C_{20}$ arylalkyl radicals, $C_6$ to $C_{20}$ arylalkenyl radicals, $C_6$ to $C_{20}$ arylcycloalkyl radicals, $C_6$ to $C_{20}$ arylcycloalkenyl radicals, $C_6$ to $C_{20}$ alkylaryl radicals, $C_6$ to $C_{20}$ alkenylaryl radicals, $C_6$ to $C_{20}$ cycloalkylaryl radicals, $C_6$ to $C_{20}$ cycloalkenylaryl radicals, $C_6$ to $C_{20}$ alkyl radicals, $C_6$ to $C_{20}$ cycloalkyl radicals, $C_6$ to $C_{20}$ alkylcycloalkenyl radicals, $C_6$ to $C_{20}$ alkenylcycloalkyl radicals, $C_6$ to $C_{20}$ alkenylcycloalkenyl radicals, $C_6$ to $C_{20}$ cycloalkylalkyl radicals, $C_6$ to $C_{20}$ cycloalkenylalkyl radicals, $C_6$ to $C_{20}$ cycloalkylalkenyl radicals, $C_6$ to $C_{20}$ cycloalkenylalkenyl radical, and mixtures thereof.

* * * * *